(12) United States Patent
Devonport

(10) Patent No.: US 6,382,666 B1
(45) Date of Patent: May 7, 2002

(54) ARRANGEMENT FOR PROVIDING DEPLOYMENT OF INFLATABLE MEMBER COAXIALLY WITH SAFETY BELT PORTION AND RELATED METHOD

(75) Inventor: Alex Devonport, Glendale, AZ (US)

(73) Assignee: Universal Propulsion Company, Inc., Phoenix, AZ (US)

( * ) Notice: Subject to any disclaimer, the term of this patent is extended or adjusted under 35 U.S.C. 154(b) by 0 days.

(21) Appl. No.: 09/524,352

(22) Filed: Mar. 13, 2000

(51) Int. Cl.[7] .............................................. B60R 21/18
(52) U.S. Cl. ................. 280/733; 280/730.1; 280/730.2; 280/743.1; 280/801.1; 280/808
(58) Field of Search ........................... 280/728.1, 730.1, 280/730.2, 733, 743.1, 801.1, 808

(56) References Cited

U.S. PATENT DOCUMENTS

| | | | |
|---|---|---|---|
| 3,682,498 A | | 8/1972 | Rutzki |
| 3,841,654 A | * | 10/1974 | Lewis ..................... 280/733 X |
| 3,848,887 A | * | 11/1974 | Fox ......................... 280/733 X |
| 4,946,191 A | | 8/1990 | Putsch |
| 5,135,256 A | | 8/1992 | Weller |
| 5,161,821 A | | 11/1992 | Curtis |
| 5,758,900 A | | 6/1998 | Tanaka et al. |
| 5,839,753 A | | 11/1998 | Yaniv et al. |
| 5,851,055 A | | 12/1998 | Lewis |
| 5,863,065 A | * | 1/1999 | Boydston et al. ............ 280/733 |
| 5,947,513 A | * | 9/1999 | Lehto ......................... 280/733 |
| 6,059,311 A | * | 5/2000 | Wipasuramonton et al. ..... 280/733 X |
| 6,062,596 A | | 5/2000 | Boydston et al. ............ 280/733 |
| 6,116,637 A | * | 9/2000 | Takeuchi et al. ............ 280/733 |
| 6,126,194 A | * | 10/2000 | Yaniv et al. ................ 280/733 |
| 6,142,511 A | | 11/2000 | Lewis ......................... 280/733 |
| 6,164,692 A | | 12/2000 | Takeuchi ..................... 280/733 |
| 6,170,863 B1 | | 1/2001 | Takeuchi et al. ............ 280/733 |
| 6,189,921 B1 | | 2/2001 | Takeuchi ..................... 280/733 |
| 6,220,626 B1 | | 4/2001 | Utsumi et al. ............... 280/733 |
| 6,237,945 B1 | | 5/2001 | Aboud et al. ............... 280/733 |
| RE37,280 E | * | 7/2001 | Tanaka et al. ............... 280/733 |

FOREIGN PATENT DOCUMENTS

| | | | | |
|---|---|---|---|---|
| DE | 003820145 | * | 1/1990 | ............. 280/801.1 |
| DE | 43 06 528 A1 | | 9/1994 | |
| DE | 42 11 209 C2 | | 5/1995 | |
| EP | 0 592 815 A1 | | 4/1994 | |
| GB | 2250176 | * | 6/1992 | ............. 280/801.1 |

* cited by examiner

Primary Examiner—Lanna Mai
Assistant Examiner—Toan C To
(74) Attorney, Agent, or Firm—Jerry J. Holden

(57) ABSTRACT

A safety belt system for a vehicle to protect an occupant having an inflatable member attached at one portion to the vehicle with the remainder of the inflatable member free to move along the safety belt during the inflation of the inflatable member. The safety belt system may be buckled up or not during such inflation.

21 Claims, 7 Drawing Sheets

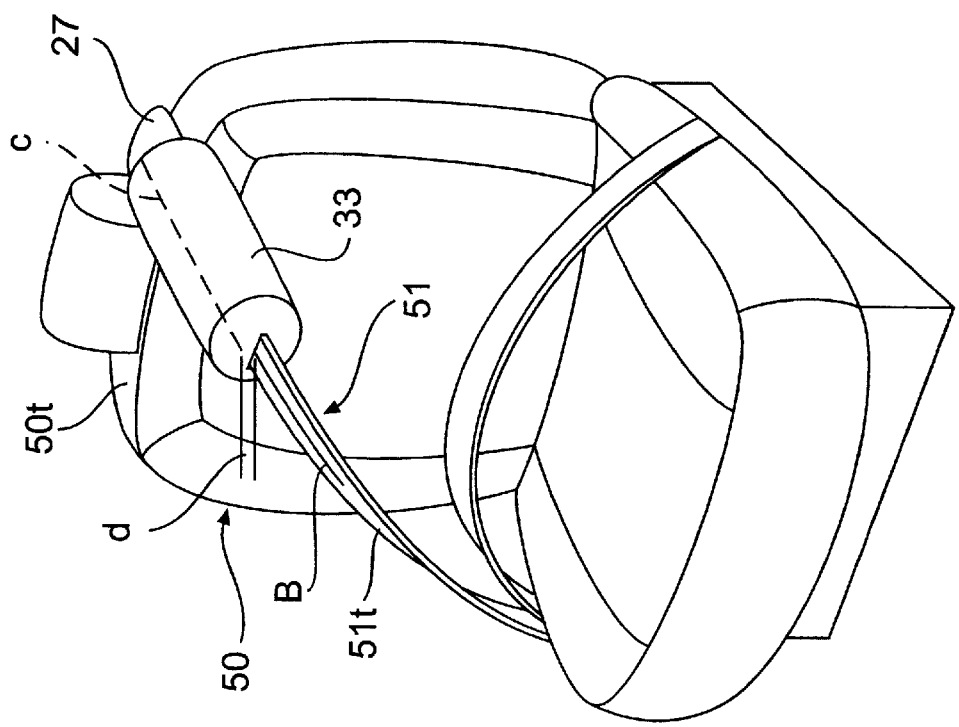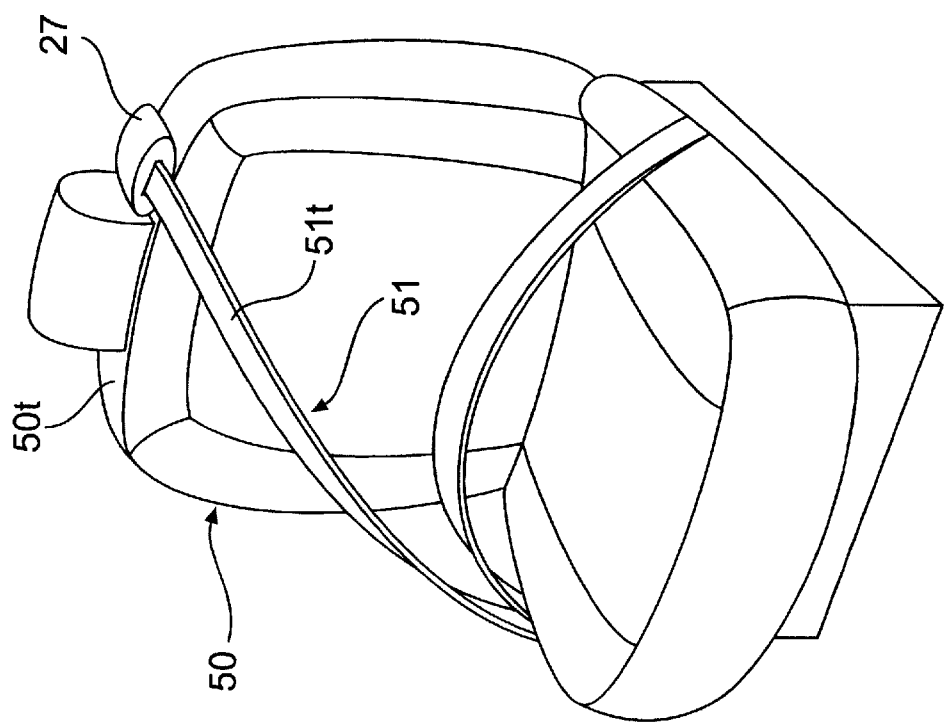

ARRANGEMENT FOR PROVIDING DEPLOYMENT OF INFLATABLE MEMBER COAXIALLY WITH SAFETY BELT PORTION AND RELATED METHOD

BACKGROUND OF THE INVENTION

It has been proposed to mount inflatable bags on or attach them to vehicle seat belts (U.S. Pat. Nos. 5,135,256 and 5,161,821). In these proposals the inflatable member is positioned around the belt and is not attached to any part of the vehicle other than the belt itself. As the member inflates it does not substantially change its position relative the belt. In another proposal an inflatable bag is positioned around a lap belt and not attached to the belt (U.S. Pat. No. 5,871, 230). This proposed system permits the occupant to slide the inflated bag side-to-side on the belt to center it prior to inflation. Once the inflatable bag is positioned it remains in that position when inflated.

SUMMARY OF THE INVENTION

Broadly, the present invention comprises an arrangement and its method of installation and operation in which a shaped inflatable member is stored adjacent a vehicle seat belt. Upon detection of a collision the inflatable member is inflated. As it deploys it is guided by the seat belt or portion thereof when the occupant is buckled-up. The invention includes an inflatable member and a device to accomplish inflation which inflatable member is preferably positioned around the seat belt or portion thereof. The inflatable member when positioned and actuated serves to protect the occupant. The inflatable member is mounted adjacent the belt prior to inflation and the inflated member travels around or along the belt when the occupant is buckled-up. After full inflation the inflated member reaches its predetermined protective position.

It is also a feature that the present invention functions when the seat belt is in its unbuckled or inactive position. The unbuckled belt is guided by the inflatable member as deployed to provide protection.

Inflation of the member including its travel along the buckled-up belt portion accomplishes pre-tightening of the belt to retard or reverse occupant movement just prior to and during deceleration of the vehicle.

The present invention is useful with any belt system such as a three point system with lap and torso portion, a four or five point harness system, as well as a two point lap belt system. The inflatable member, the inflator, the crash sensor and other associated equipment may be enclosed in a modular unit which may be mounted adjacent portions of the safety belt arrangement. Bags protect the head, neck, shoulder, torso, lap or leg of the occupant.

BRIEF DESCRIPTION OF THE DRAWINGS

FIG. 5 is a sectional view and along line 5—5 of FIG. 4a;

FIG. 6b is a sectional view taken along line 6b—6b of FIG. 6a;

FIG. 7a is a perspective view of a vehicle seat having a three point belt with the bag storage unit mounted on the seat back;

FIG. 7b is a perspective view similar to FIG. 6a with the bag deployed;

DESCRIPTION OF THE PREFERRED EMBODIMENTS

Figure 2:
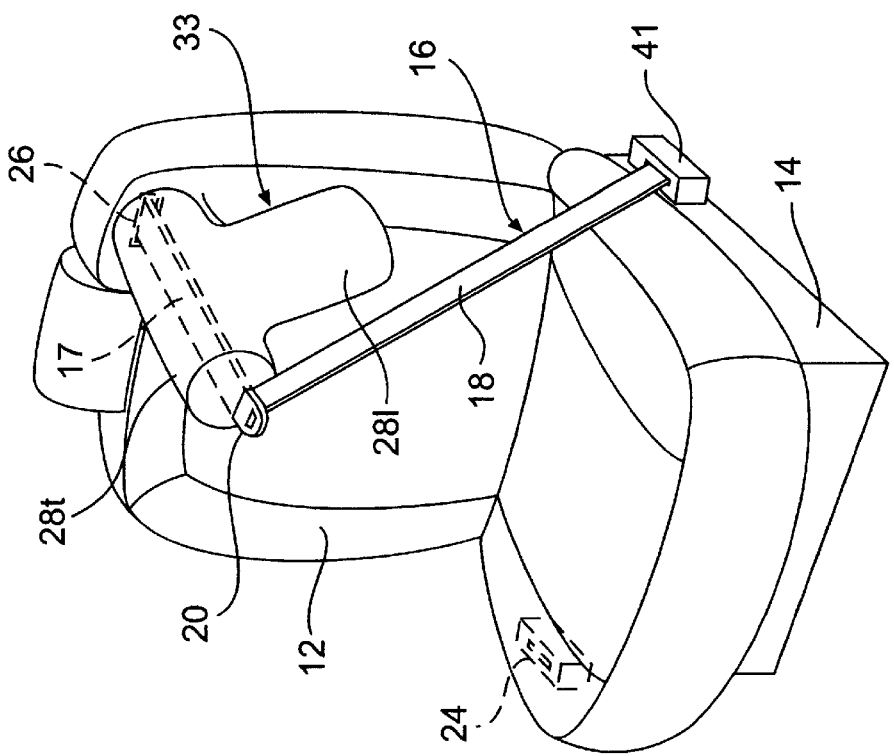
FIG. 2 is a perspective view of a seat similar to FIG. 1 showing inflation of the inflatable member with the belt unbuckled.
Figure 1:
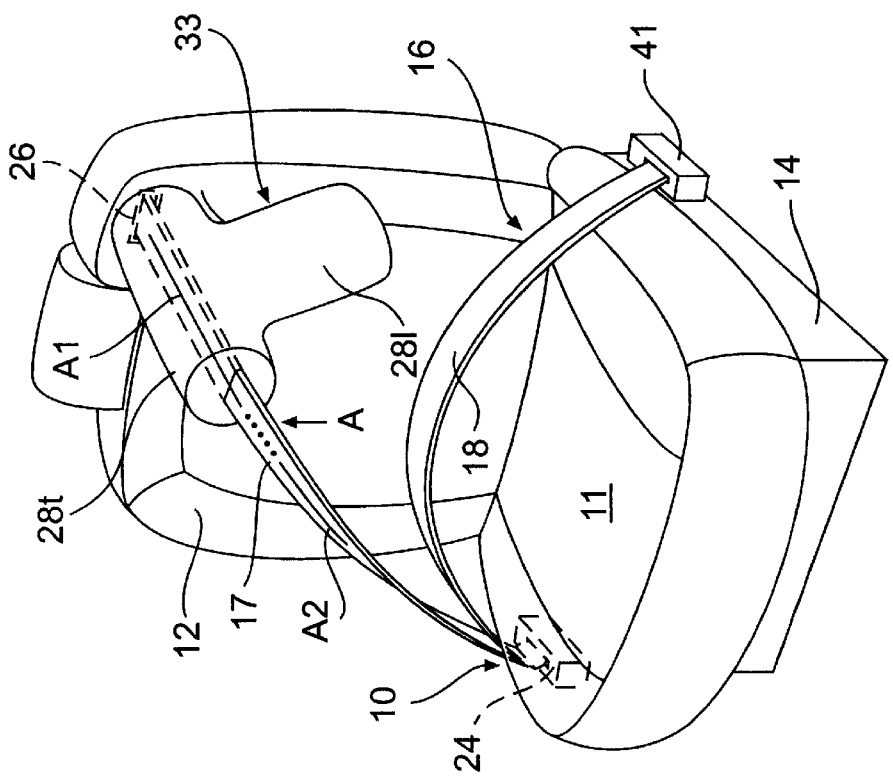
FIG. 1 is a perspective view of a vehicle seat in which an inflatable bag of the present invention is stored within the seat back and thereafter deployed with the belt buckled up.

In FIGS. 1 and 2, seat 10 includes seat portion 11, back portion 12 and platform support 14. Belt arrangement 16 includes torso portion 17, lap portion 18, latch tongue 20, retractor 41 and tongue receiver 24. Torso portion 17 is fed into and out of slot 26 and anchored by a retractor behind the seat (not shown). Inflated bag 33 includes tubular portion 28t and lower portion 28l. Bag 33 is anchored to a bag storage unit 25 positioned in seat 10. Unit 25 may be positioned on seat 10 or at other locations in the vehicle.

In FIG. 1, with the occupant buckled-up, bag 33 as inflated is positioned between the occupant and torso belt portion 17 to provide protection. Bag portion 28l provides protection for the thorax area of the occupant. In FIG. 2, though belt arrangement 16 is not engaged in tongue receiver 24, torso belt portion 17 is positioned under influence of deployment of bag 33 in a direction placing bag 33 adjacent the occupant to provide both frontal and side impact protection. The deployment of bag 33 may partially cover belt portion 17 as shown in FIG. 2. Alternatively, bag 33 may, when deployed, cover more or all of belt portion 17. Torso belt portion 17 has axis A which includes upper axis A1 and lower axis A2 which axes do not lie in a straight line due to the curvature of belt portion 17 (FIG. 1). The axis of bag portion 28t is coaxial with upper axis A1.

Figure 3:
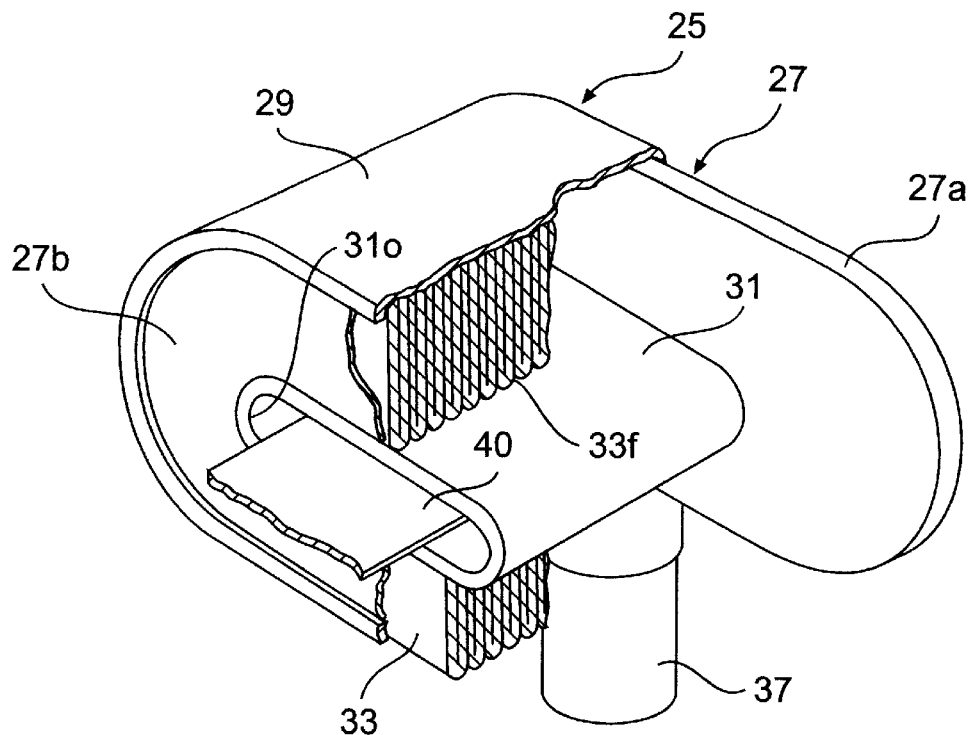
FIG. 3 is a cutaway perspective view of the bag storage unit with housing and gas supply tube.

Turning to FIG. 3, bag storage and deployment unit 25 including housing 27 is positioned in or on a seat or at other appropriate vehicle locations. Housing 27 includes oval back panel 27a and oval front panel 27b and curved body portion 29. Front panel 27b is preferably made of a light opaque plastic sheet that is ruptured by the exiting bag. Mounted on and projecting from back panels 27a is seat belt webbing pass-through guide 31 having exit opening 31o similar to slot 26 in FIGS. 1 and 2. Seat belt section 40 passes through guide 31 which is preferably made of a low friction material to facilitate reciprocal movement of belt portion 17 in guide 31. Seat belt section 40 may be a torso belt portion such as portion 17 of FIGS. 1 and 2. Unit 25 further includes gas supply tube 37 and inflator 38. Unit 25 is enclosed in modular housing 15 including modular housing 27, tube 37 and inflator 38 (see FIG. 4a). Also shown is crash detector 39.

Figure 5:
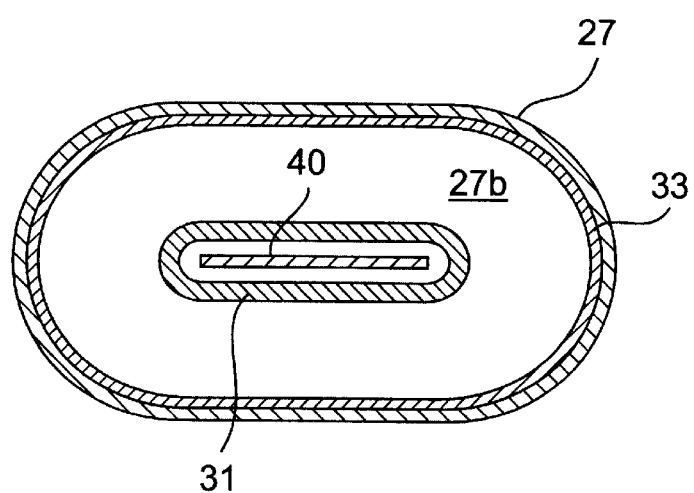
Figure 4A:
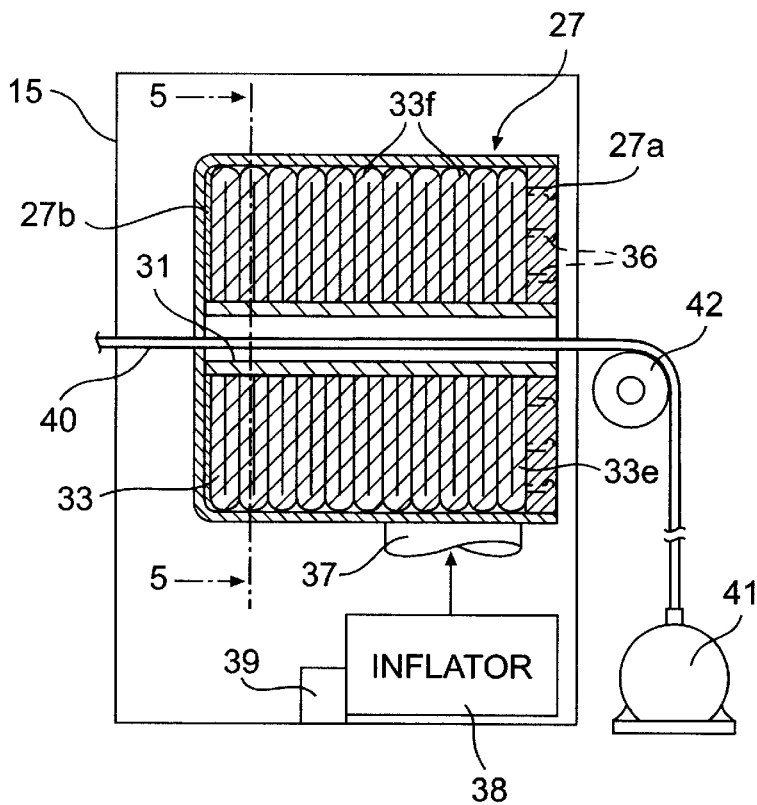
FIG. 4a is a sectional view of a bag storage unit of FIG. 3 with the bag folded in the housing and including a retractor from which the belt pays out.
Figure 4B:
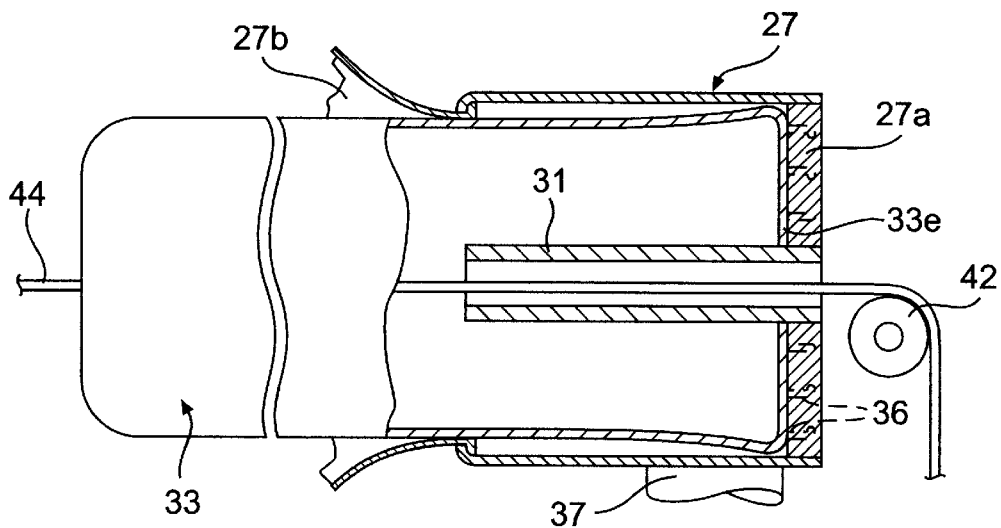
FIG. 4b is a view similar to FIG. 4a with the bag deployed.

FIG. 4a depicts bag storage housing 27 storing folded bag 33 having bag end 33e attached to back panel 27a and with hooks 36 for attaching bag 33 to housing 27. Bag 33 is folded in accordion fashion creating folds 33f. Gas intake tube 37 supplies gas from an inflator 38. Seat belt section 40 is payed out of retractor 41 over roller 42. In FIG. 4b, bag 33 is shown deployed in its inflated state. Front panel sheet 27b is ruptured by the force of the exiting bag 33. Bag 33 has sufficient fabric thickness so that upon inflation to about ten (10) psi gas pressure bag 33 is projected outwardly partially guided by belt 40, if the belt is buckled up, to nearly a horizontal position. In FIG. 5, housing 27, front panel 27b, bag 33, pass-through guide 31 and belt portion 40 are shown.

Figure 6A:
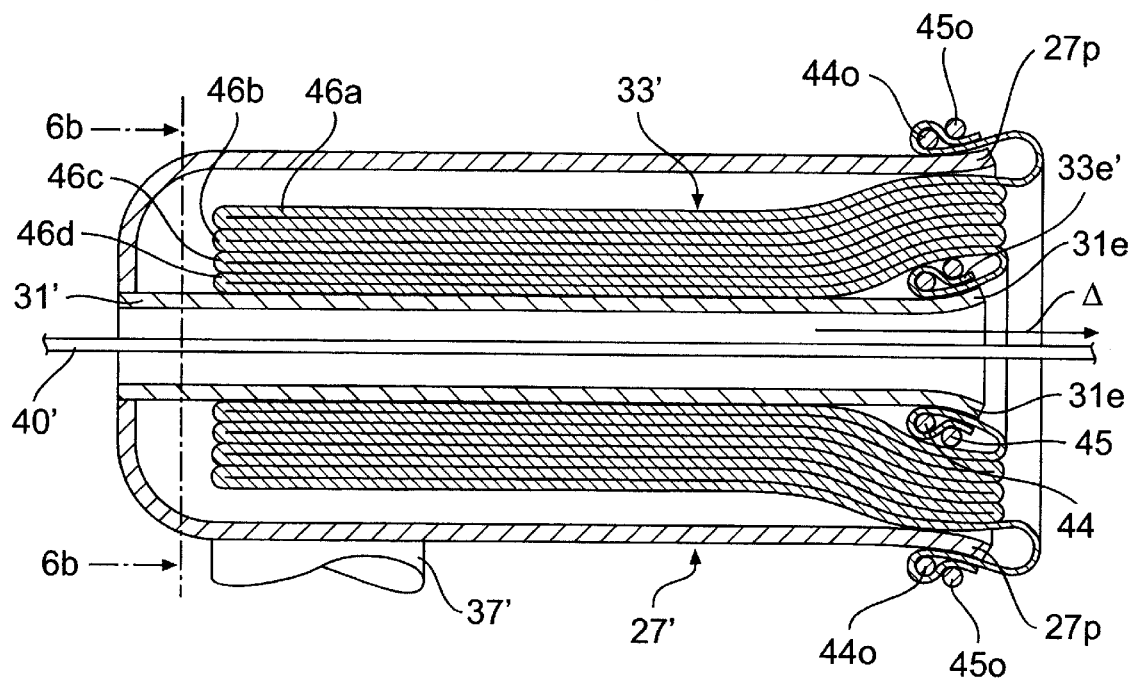
FIG. 6a is a sectional view of the bag storage unit with an alternative bag storage arrangement.
Figure 6B:
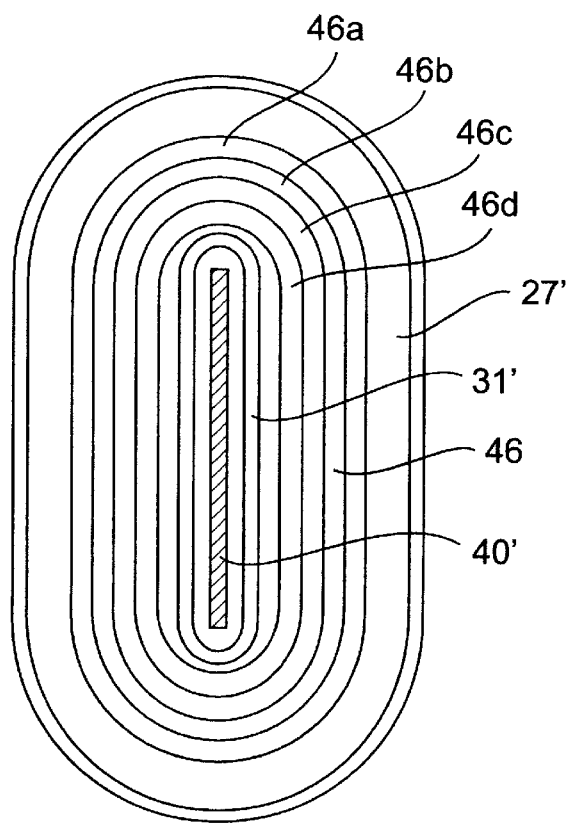

Turning to FIGS. 6a and 6b, an alternative bag mount and folding configuration is shown including housing 27' and pass through guide 31' similar to the construction shown in FIGS. 3, 4a, 4b and 5. Bag 33' has its end portion 33e' held between outer bag retaining ring 44o and outer jam ring 45o and inner ring 44' and inner jam ring 45. Bag end 33e' is secured by rings 44o, 45o and 44, 45, squeezing bag end 33'e sufficiently that it will not release from such position upon inflation. Bag 33' is folded for storage in housing 27' in folds 46. Gas inlet 37' introduces gas which causes bag 33' to exit housing 27' in direction D and inflate around belt section 40'.

Comparing the embodiment of FIGS. 3, 4a, 4b and 5 and the embodiment of FIGS. 6a, 6b, it is seen that in FIGS. 3, 4a, 4b and 5 by attaching bag end 33e to the back panel 27b of housing 27 an inflated portion of bag 33 remains in the housing to provide greater stiffness to the bag portion in and adjacent the housing 27. In contrast, in the embodiment of FIGS. 6a, 6b, by attaching the bag 33' to the exit perimeter 27p of housing 27' and the opening edge 31e of pass-through 31' (FIGS. 6a, 6b), the effective deployed length of the bag 33' is increased.

Rigidness of bags 33, 33' may be increased by using a thicker, stiffer bag material or by increasing the pressure and volume supplied by the inflator or both. Bags of any configured shape may be used. Where bags are non-cylindrical in shape some of folds 33f, 46a–b may be double folded as positioned in housings 27, 27' or may be folded in any other suitable way. During deployment of bag 33, 33', the folds 33f, 46a–d are caused to exit housings 27, 27' by the gas pressure. In the initial stages of the deployment gases pass between the folds 33f, 46a–d and as more gases are supplied bags 33, 33' are fully inflated to their effective length (see, for example, FIG. 4).

In FIGS. 7a, 7b, a bag storage and deployment unit 27 is mounted on the top surface 50t of back seat portion 50. Three (3) point belt arrangement 51 is shown in a buckled-up mode including torso portion 51t. In FIG. 7b, bag 33 is shown deployed from unit 27 to a position around torso portion 51t. In FIG. 7b, belt portion 51t has axis B and inflated member 33 has axis C. Axes B and C do not lie in the same line but are offset by the distance d.

Figure 8A:
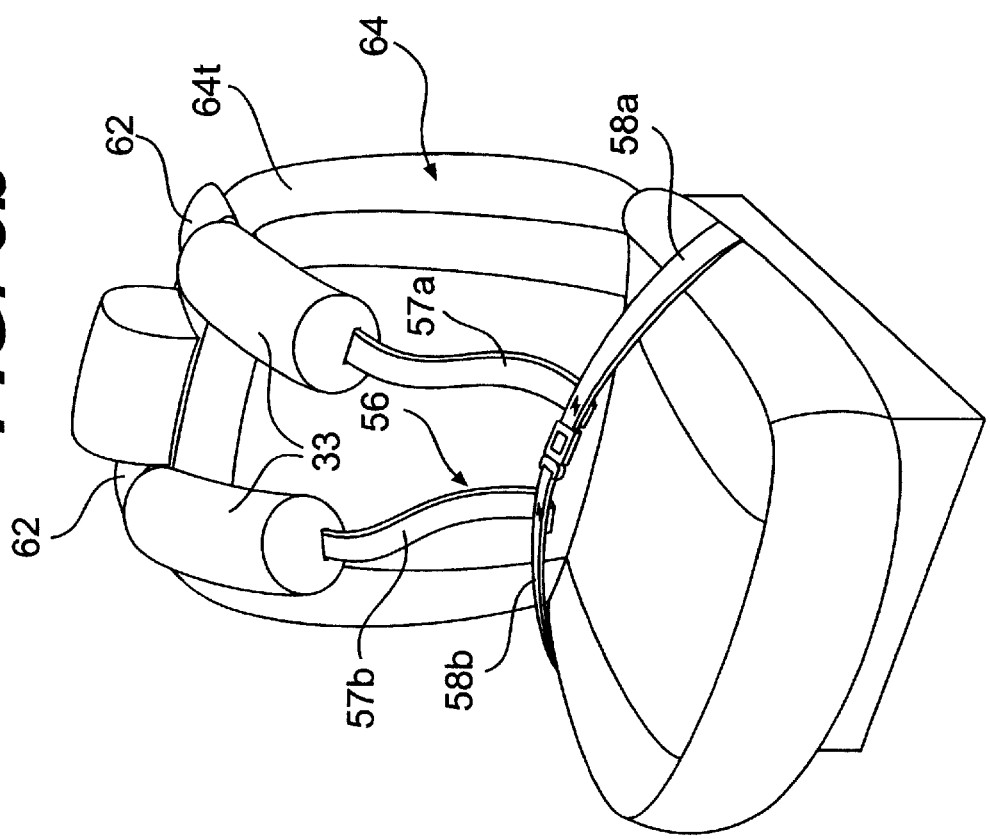
FIG. 8a is a perspective view of a vehicle seat with two units mounted on the seat back to serve a four point harness belt arrangement.
Figure 8B:
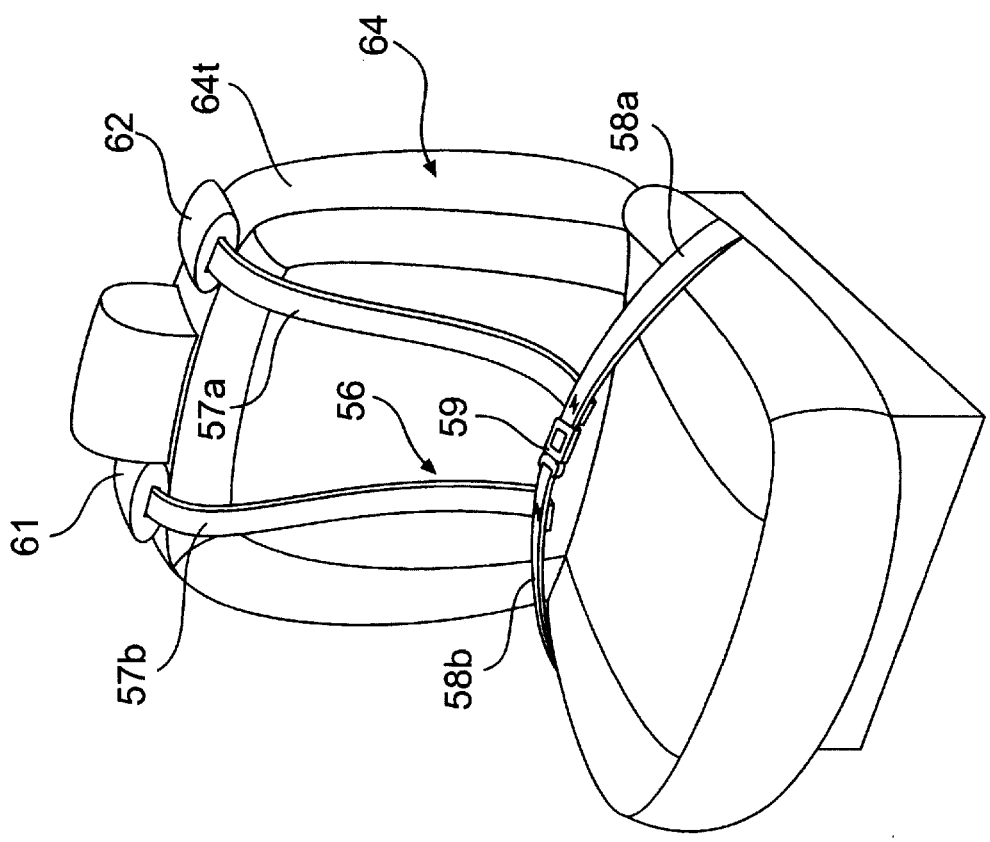
FIG. 8b is a view similar to FIG. 7a with the bags deployed.

In FIGS. 8a, 8b, a four (4) point belt system 56 is shown in buckled-up mode including two (2) torso portions 57a, 57b and two (2) lap belt portions 58a, 58b connected by buckle and tongue unit 59. Two (2) bag units 61, 62 are positioned on the top surface 64t of seat back portion 64. FIG. 8b shows bags 33 deployed.

Figure 9B:
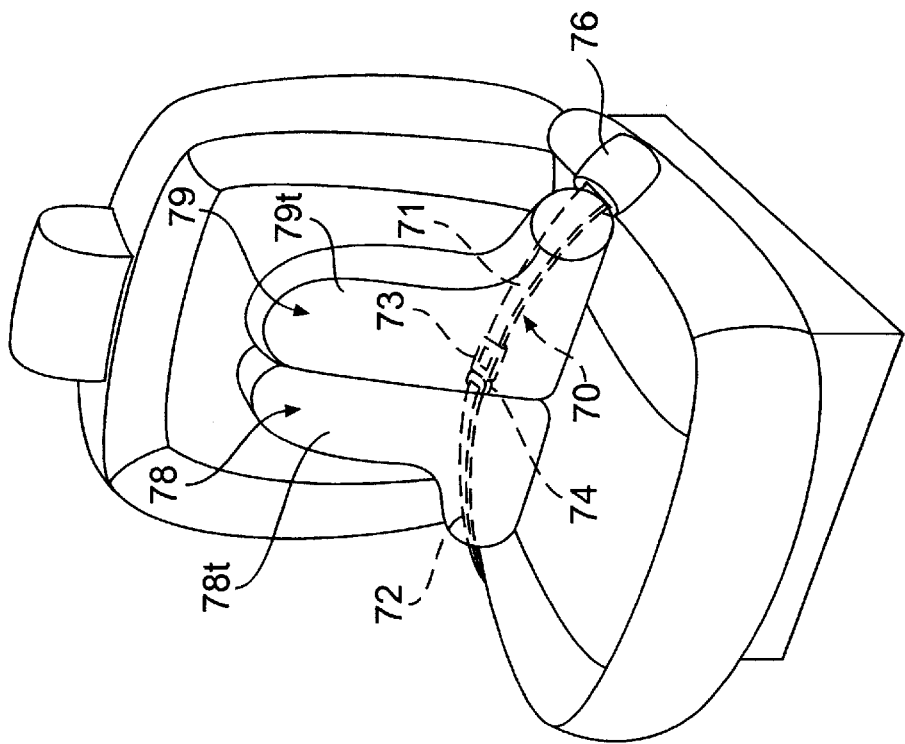
FIG. 9b is a view similar to FIG. 8a with the bags deployed.
Figure 9A:
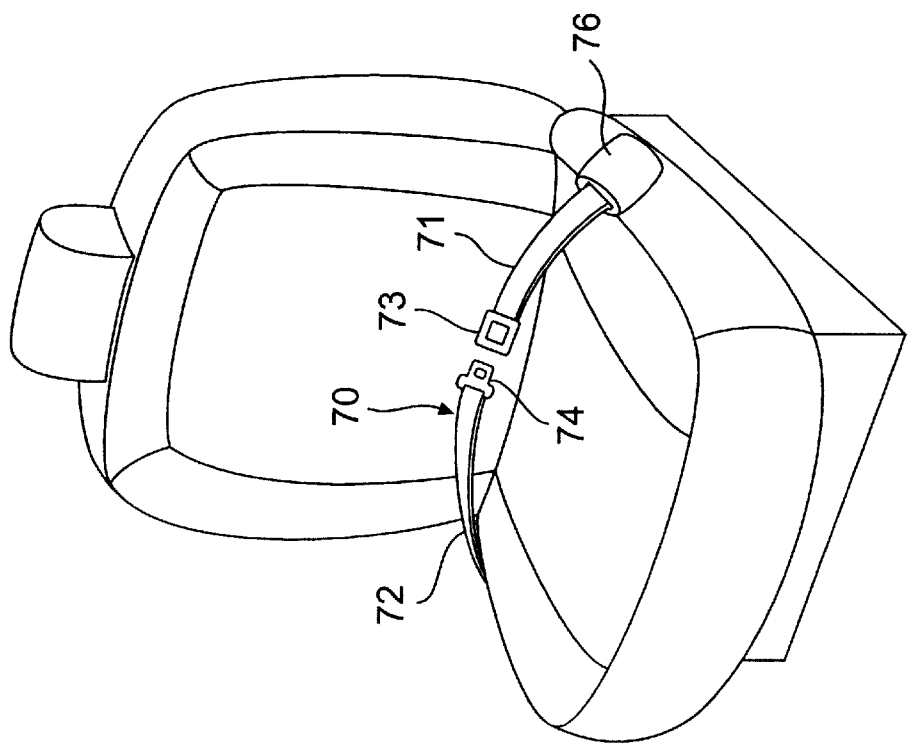
FIG. 9a is a perspective view of a seat with a two point lap belt with two bag units mounted on the sides of the seat.

Finally, in FIG. 9a, a two (2) point lap belt system 70 including belt portions 71, 72 with buckle 73, and tongue 74 is shown unbuckled. Bag units 76 and 77 (not shown) provide bags 78, 79 with upwardly projecting bag sections 78t and 79t. In FIG. 9b, the buckled 73 and tongue 74 are connected and bags 78, 79 inflated.

In the operation of the present invention, when the belt arrangement is in its buckled-up mode, the inflated bag or other member is guided by a portion of the belt arrangement as the inflated bag or other member is deployed resulting in a) a consistent and predictable placement of the bag or member as fully deployed;

b) the bag or other inflatable member being deployed prior to the occupant starting or substantially progressing in his or her forward (or other directional) movement thus permitting the bag or other member to be introduced between the occupant and the belt arrangement causing the belt arrangement to be pre-tensioned.

The bag or other inflatable member is preferably guided, in the buckled-up mode, by a belt portion by surrounding the belt portion but the bag or member alternatively can be guided by the belt through other means such as by shaping the bag so that it has an outer guide channel to facilitate the belt portion guiding the bag or other member as it moves during its inflation. In the unbuckled mode, the bag or other inflatable member guides the belt.

Preferably, the axis (whether straight lined or curved) of the belt portion is substantially the same as the axis of a surrounding tubular or cylindrical bag or bag section; however, axes may be parallel, nonparallel, offset or spaced apart, provided the belt portion is positioned, when buckled up, to provide guidance to the bag as it is deployed.

Inflatable bags employed with this invention may be of any shape, size or configuration and may be folded and attached to the unit, seat, or other compartment part by appropriate attachment means. Bags may be configured and anchored to protect the head, neck, shoulder, torso, lap and legs of the occupant.

Herein "coaxial" refers to an axis of a belt portion and an axis of the inflatable member coinciding, being parallel or having other similar predictable relationship upon inflation of the inflatable member.

I claim:

1. A vehicle safety restraint system for protecting an occupant, wherein a seat belt arrangement has buckled-up and unbuckled-up modes, comprising:

a belt portion adjacent a seat;

an inflatable member adjacent the belt portion, wherein a portion of the inflatable member is part of the seat; and an inflator in fluid communication with the inflatable member in both buckled-up and unbuckled-up modes;

wherein, the inflatable member is elongated and having two spaced apart end portions with one end portion attached to the seat and the other end portion free to travel along the belt portion as the inflatable member inflated.

2. The vehicle safety restraint system of claim 1 in which the seat belt arrangement is buckled up during inflation of the inflatable member and in which the belt portion guides the inflatable member during such inflation.

3. The vehicle safety restraint system of claim 1 in which the inflatable member surrounds the belt portion prior to and after inflation.

4. The vehicle safety restraint system of claim 1 in which the seat belt arrangement is not buckled up during inflation of the inflatable member and the inflatable member guides the belt portion during such inflation.

5. The system of claim 1 in which the seat belt arrangement is a three point belt arrangement.

6. The system of claim 1 in which the seat belt arrangement is a four point belt arrangement.

7. The system of claim 1 in which the seat belt arrangement is a two point belt arrangement.

8. The vehicle restraint system of claim 1, wherein the seat further comprises a housing.

9. The vehicle restraint system of claim 8, wherein the housing is mounted on a top surface of the seat.

10. The vehicle restraint system of claim 8, wherein the housing further comprises the inflator.

11. A method of restraining an occupant in a vehicle comprising the steps of:

providing a seat with a safety belt system having buckled-up and unbuckled modes;

positioning an inflatable member adjacent the safety belt system within a housing, wherein the housing is part of the seat; and deploying the inflatable member with an inflator in such a manner that the inflatable member is engaged by the belt system when inflated in a buckled-up or unbuckled-up mode:

wherein, the inflatable member is elongated and having two spaced apart end portion with one end portion attached to the housing and the other end portion free to travel along the belt portion during the deploying step.

12. The method of claim 11 in which the safety belt system is buckled up during the deploying step and the belt portion guides the inflatable member during such inflation.

13. The method of claim 11 in which the inflatable member is positioned to surround the belt portion prior to and after inflation.

14. The method of claim 11 in which the safety belt system is not buckled up during the deploying step and the inflatable member guides the belt portion during such inflation.

15. The method of claim 11 in which the seat belt system is a three point belt arrangement.

16. The method of claim 11 in which the seat belt system is a four point belt arrangement.

17. The method of claim 11 in which the safety belt system is a two point belt arrangement.

18. A method of restraining an occupant in a vehicle comprising the steps of:

providing a seat with a safety belt system;

locating an inflatable member around a safety belt system, wherein the inflatable member has two end portions;

supplying an inflation arrangement for inflating the inflatable member;

providing a housing to contain the inflatable member and the inflation arrangement, wherein the housing is part of the seat; and connecting one end portion of the inflatable member to a portion of the housing, whereby upon inflation of the inflatable member the connected end does not move relative to the safety belt while the other end travels along the safety belt system.

19. The method of claim 18 in which the safety belt system is a three point belt arrangement.

20. The method of claim 18 wherein the safety belt system has buckled-up and unbuckled-up modes, and wherein the inflatable member is inflated in the unbuckled-up mode.

21. The method of claim 18, wherein the safety belt system has buckled-up and unbuckled-up modes, and wherein the inflatable member is inflated in the buckled-up mode.

* * * * *